Figure 1:
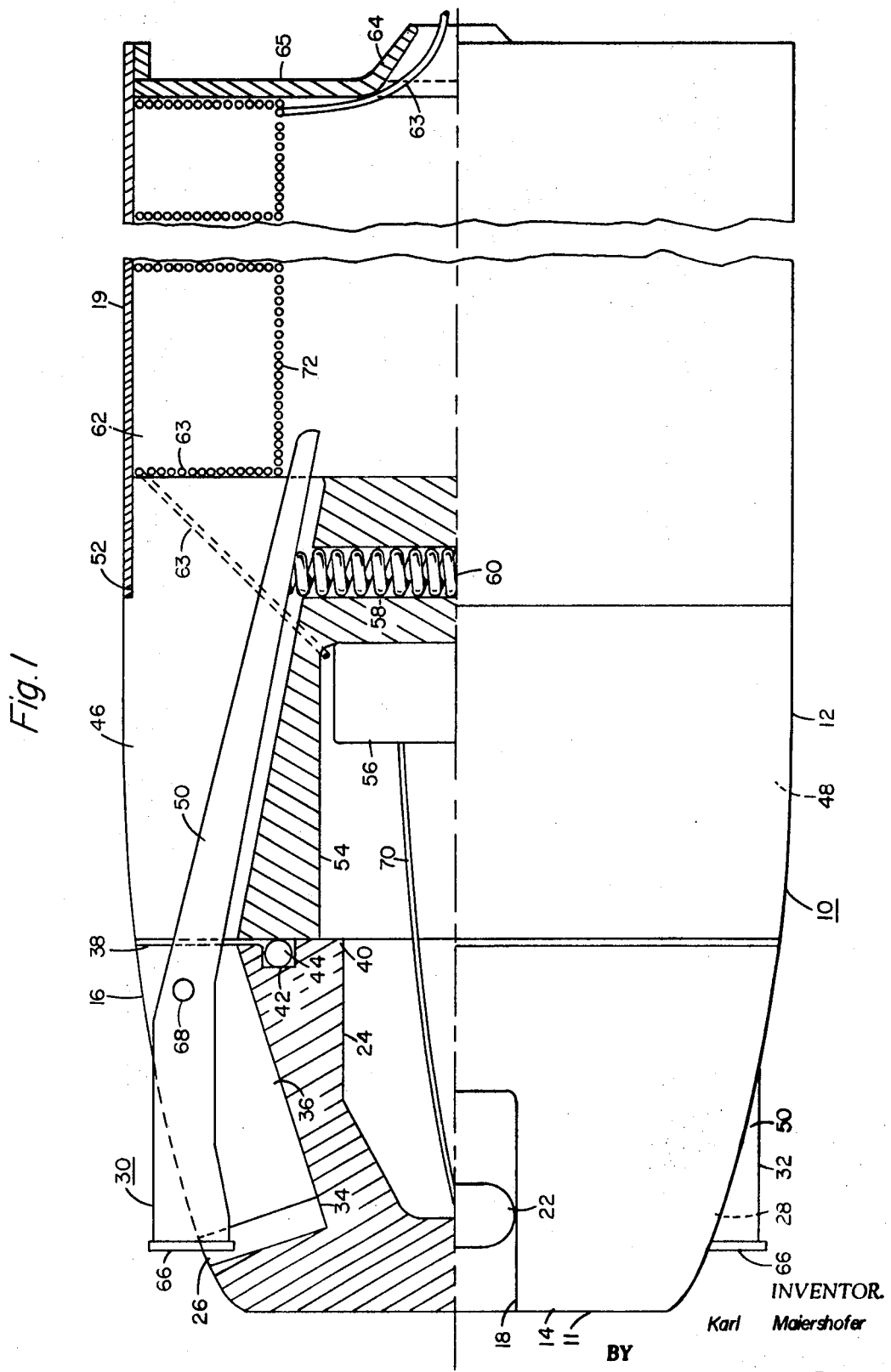

United States Patent

[11] 3,604,258

[72] Inventor Karl Maiershofer
Scottsdale, Ariz.
[21] Appl. No. 868,063
[22] Filed Oct. 21, 1969
[45] Patented Sept. 14, 1971
[73] Assignee Motorola, Inc.
Franklin Park, Ill.

[54] UNIFORM DESCENT-RATE PROBE
9 Claims, 4 Drawing Figs.

[52] U.S. Cl. .......................................... 73/170 A
[51] Int. Cl. .......................................... G01d 1/00
[50] Field of Search ............................. 73/170 A

[56] References Cited
UNITED STATES PATENTS
3,339,407  9/1967  Campbell et al. ........... 73/170 (O)
3,511,092  5/1970  Saunders ...................... 73/170 (O) X Primary Examiner—Jerry W. Myracle
Attorney—Mueller & Rauner ABSTRACT: As a probe descends into the water under the influence of gravity, a wire is paid out to carry to a signal indicator information concerning the properties of the water such as the temperature thereof, at various depths of the water. Means are provided to keep the rate of descent of the probe constant even though the paying out of the wire lessens the weight of the probe. These means may take the form of variably positionable spoiler vanes that add less and less amounts of resistance of the water to the descent of the probe therethrough as the probe becomes lighter, or means to cause more water to flow through the probe as the weight of the probe becomes less.

UNIFORM DESCENT-RATE PROBE

BACKGROUND

The invention herein described was made in the course of or under a contract with the Department of the Navy.

This invention relates to probes which sink through water due to the force of gravity at uniform rates. The probes may return information, such as the temperature of the water, at different depths of the water to a signal indicator. The signal indicator may be located on a float to which the probe is connected by one or more conductors.

It is desirable to know a property of a fluid such as water at various depths thereof. The temperature may be measured by dropping a probe into the water, the probe carrying a temperature-sensing means that is exposed to the water flow. The temperature is changed to an electrical signal by the sensor and the signal is coupled to a signal indicator or transmitter at the water surface by a wire or cable that is contained in the probe and that is paid out as the probe sinks into the water. If the descent of the probe is uniform with time, then the time at which the indicator is observed is a measure of the depth at which the temperature reading is taken. If the weight of the probe remains uniform as it sinks and as it pays out wire, its rate of descent wild be uniform. This uniform rate of descent has been accomplished by using a lead wire which is of the same weight as the water displaced thereby, whereby the wire weighs nothing when immersed in water and whereby paying out of the wire from the probe does not change the immersed weight of the probe. Such wire, however, is very bulky, whereby the size and, therefore, the cost of a probe including such wire is great for a probe carrying enough such wire to provide information as to the water temperature at great depths such, for example, as 5000 feet.

It is an object of this invention to provide an improved probe that will descend at a uniform rate into water of great depth.

It is another object of this invention to provide an improved probe for determining the properties of water at various depths thereof.

SUMMARY

In accordance with this invention, a probe is provided which carries a winding of wire that is heavier than water, whereby the weight of the probe is reduced as the probe sinks down through the water and the wire is paid out. Such a reduction in weight results in a reduction in the speed of the probe as it sinks down in the water. Means are provided to decrease the resistance of the water to the passage therethrough of the probe as the weight of the probe decreases. This means may take the form of spoiler means which extend variable distances from the body of the probe and which are less and less exposed to the water as the probe becomes lighter. As another way to provide uniform descent rate of a probe, a passageway for the water is provided through the probe and the size of the passageway is increased as the probe loses weight, whereby the probe encounters less resistance to passage through the water as it gets lighter.

Figure 2:
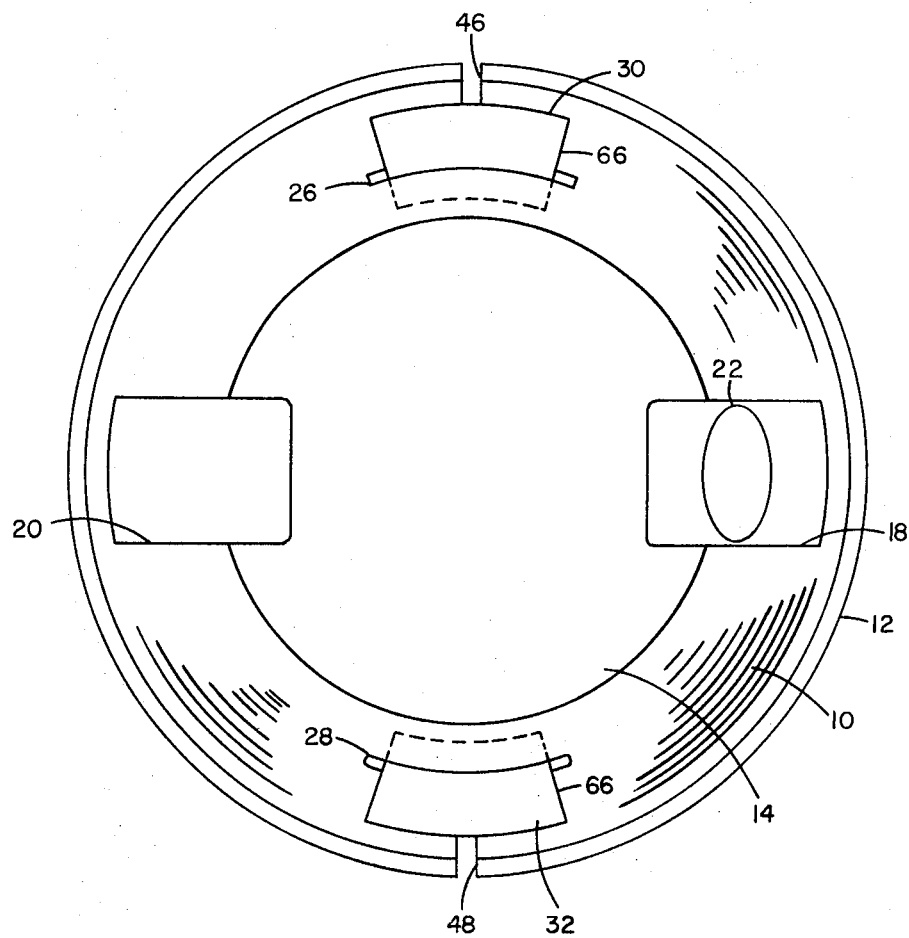
Figure 3:
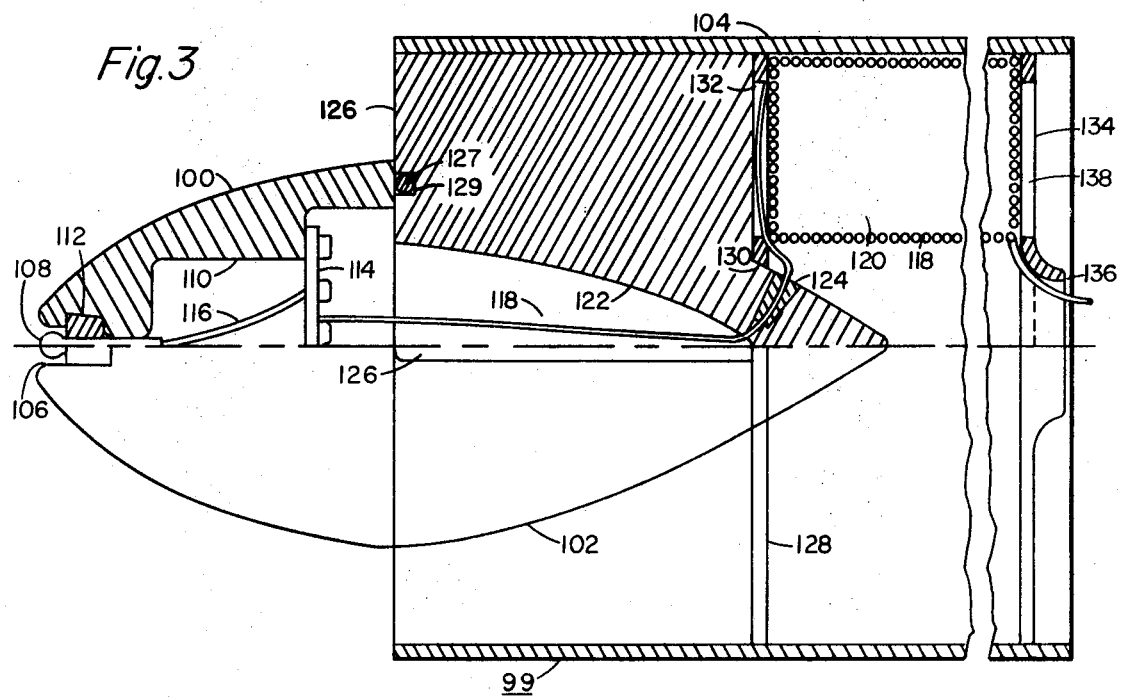
Figure 4:
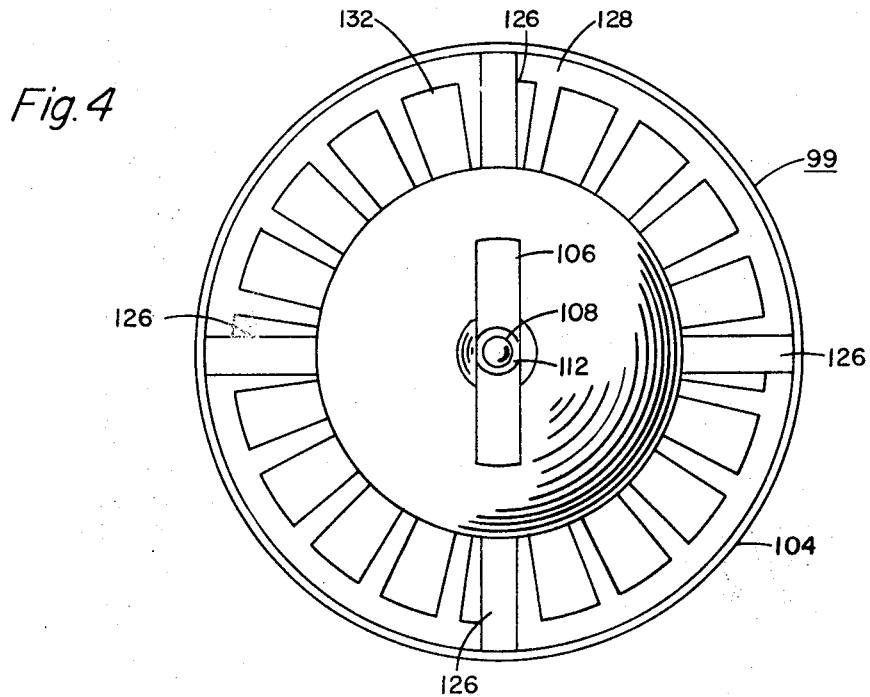

The invention will be better understood upon reading the following description in connection with the accompanying drawing in which:

FIG. 1 is a side view of a probe, including a preferred embodiment of this invention, one-half of the probe being shown in longitudinal section, FIG. 2 is a front end view of the probe of FIG. 1, FIG. 3 is a side view of a probe also including an embodiment of this invention, one-half of this probe also being in section, and FIG. 4 is a front end view of the probe of FIG. 3.

Turning first to FIGS. 1 and 2, the front face part of the probe 10 comprises two portions 11 and 12, preferably zinc castings. The front face 14 of the front portion 11 is flat. The outside surface 16 of the front portion 11 is a rounded cone, the front end of the rounded cone 16 forming a smooth gradual junction with the front face 14. Grooves 18 and 20 (see FIG. 2) are formed in the front portion 11 and extend in a rearwardly and outwardly slanting direction from points in the front face 14 to points in the conical surface 16 (see FIG. 2). A temperature sensor 22 is set in the groove 18 with its outer surface nearly flush with the bottom of the groove 18. As the probe 10 moves through the water, water moves by the sensor 22 whereby the temperature thereof is sensed. Only one sensor 22 is provided, however, two similar and symmetrically positioned grooves 18 and 20 are provided so that the probe will not be deflected from a straight path as it would be if only one groove 18 were provided. The sensor 22 is set in a hole that extends rearwardly as well as radially inwardly whereby the inner end of the sensor 22 (not shown) extends into a hollow portion 24 of the front portion 11.

Two T-shaped grooves 26 and 28 are formed in the portion 11 and are positioned 180° away from each other and 90° from the slots 18 and 20. The grooves 26 and 28 are shaped to fit the respective spoiler vanes 30 and 32 (FIG. 1) as will be explained. The portion of the slot 26 comprising the top of the T is an opening 34 cut in a plane which intersects the axis of the front portion 11, the opening 34 extending radially inwardly and rearwardly as shown in FIG. 1. The slot 26 also comprises an opening 36 which corresponds to the stem of the T and which extends in a plane through the axis of the portion 11. The shape of the slot 28 is the same as that of the slot 26. The slots 26 and 28 extend toward each other from opposite sides of the portion 11. The rear surface of the portion 11 comprises an outer annular plane 38 and an inner annular plane 40. The surface 40 extends further back than the surface 38. An annular groove 42 is positioned therebetween for receiving a compressible O-ring washer 44. When the portions 11 and 12 are fixed to each other tightly by a means (not shown), a strong watertight seal is formed between the portions 11 and 12 to provide a watertight chamber therein.

Portion 12 includes diametrically opposed slots 46 and 48 which are the continuations of the stems of the T-shaped slots 26 and 28, respectively, and are formed to accept lever portions 50 of the spoiler vanes 30 and 32. The rear outside periphery of the portion 12 is reduced in diameter at 52 to receive the forward end of a hollow cylindrical portion 19. The forward inner portion 54 of the portion 12 is hollow and with the hollow portion 24 of the portion 11 forms a watertight chamber for receiving electrical equipment 56. A hole 58 is provided for receiving a compression spring 60 which urges the lever portion 50 of the spoiler vanes 30 and 32 apart, as will be further explained.

A coil of wire 63 is provided in the chamber provided by the back cylindrical portion 19. The cylinder 19 may be of aluminum or plastic. The rear end of the cylindrical portion 19 is closed by a closure 65 having a central conical portion 64 for guiding the wire 63 of the coil 62 centrally outside from the cylindrical portion 19. The junction of the flat portion of the closure 65 and the cone 64 is radiused to prevent cutting or injuring the insulation of the wire 63 as the wire 63 pays out.

The spoiler vane 32 is of a similar T shape to the spoiler vane 30. The head of the T comprises a front plate 66 which has radially extending side edges and concentric end edges as shown in FIG. 2. The lever 50 corresponding to the stem of the T is integrally fixed to the center of the back of the plate 66 and extends rearwardly in a bent manner as shown in FIG. 1. The lever 50 is pivoted on a pivot 68 on the rear part of the portion 11 in the slot 36. The portion of the lever 50 behind the pivot 68 extends through the slot 46 into the cylindrical portion 19. The spring 60 tends to urge the two levers 50, 50 apart, whereby the rearward end of the levers 50, 50 contact the inner wound course 72 of the coil 62, and the position of the spoiler vane portion 66 and therefore the extent of its exposure to the water through which the probe 10 will move is determined by the inner diameter of the coil 62. As the wire 63 of the coil 62 is paid out, the exposure of the vane portion 66 to the water becomes less, as will be more fully explained.

In the use of the probe of FIGS. 1 and 2, it may be dropped or thrown from a boat or aircraft into a body of water in a container with a buoy (not shown). Or, the probe may be dropped from a boat separately from the buoy. In this case, the radio equipment on the boat picks up the signal indicating water temperature from the sensing device in the buoy through a wire, one end of the wire being retained on the boat. The buoy contains radio transmission equipment and is connected by a wire 63, which is the end of the wire comprising the coil 62, to the electrical apparatus 56. The apparatus 56 is connected to the temperature sensor 22 by a wire 70. The electrical signal provided by the sensor 22 is amplified in the apparatus 56 and arrives at the buoy (not shown) by the wire 63 comprising the coil 62. The buoy radiates signals to nearby radio receivers on the boat or aircraft. For the signals to be meaningful, they must be related to the depth of the sensor 22 and therefore of the probe 10 on which the sensor 22 is mounted. If the probe sinks through the water at a known regular rate, the time when the signals are received indicates the depth of the probe 10. The wire 63 comprising the coil 62 is heavier than the same volume of water since, as noted above, providing wire having the same weight as water would be wasteful of space in which the wire 63 is stored. Therefore, as the probe 10 sinks and the wire 63 from the coil is paid out, the wire 63 being heavier than water, the probe 10 becomes lighter and the speed of descent thereof tends to decrease, destroying the direct relation between the time when the probe signals are received and the depth at which the probe has sunk. The spoilers 30 and 32 and the means for causing the extent of exposure of the platelike portion 66 thereof are provided to prevent this change of speed of descent from taking place as the probe loses weight.

As illustrated, the plates 66 are exposed to the water to their maximum extent and they are held in the shown position by the rear tips of the levers 50 contacting the inner course 72 of the coil 62. The plates 66 spoil the hydrodynamic front surface of the probe to the greatest extent when the coil 62 is complete (that is, before any of the wire 63 thereof is unwound, and the speed of descent of the probe 10 is slowed down by the plates 66. As the wire comprising the coil 22 is paid out, the probe becomes lighter and the speed of the probe tends to decrease. When the inner course 72 of the coil 62 disappears, the rear end of the lever 50 moves outwardly under the urging of the spring 60 to contact the new inner course of the coil 62. The front end of the lever 50 moves inwardly and less of the plate 66 is exposed, whereby the speed of the probe tends to increase. The shape and size of the plates 66 are so chosen that the motion thereof overcomes the tendency of the probe to sink at a slower speed, whereby the probe descends at a uniform speed. While the motion of the lever and therefore of the plate 66 is in fact in substantial increments as the forward ends of the successive courses 72 disappear, due to the inertia of the probe 10 which may weigh about 5 pounds and which may travel at about 18 feet per second as an example, the rate of descent of the probe is made uniform. Therefore, signals received from the sensor 22 by way of the electrical equipment 56 and the wire 63 comprising the coil 62 and the electrical equipment present on the buoy (not shown) may be meaningfully related to the depth of the water through which the sensor 22 is passing due to the uniform rate of speed of descent of the probe 10.

Another probe 99 illustrating an embodiment of this invention is shown in FIGS. 3 temperature 4. The probe 99 includes a front portion 100, an intermediate portion 102, and a tubular rear portion 104. The front portion is streamlined in shape and has a slot 106 extending across the front face thereof. The slot 106 is deepest where it crosses the front face of the front portion 100 and becomes more shallow as it extends back ending part way back of the front face of the front part 100. The slot 106 is symmetrical with respect to the longitudinal axis of the portion 100, whereby the slot 106 causes no deflection from the vertical in the descent of the probe 99 into the water. An electrical temperature sensor 108 extends into the portion 100 through the bottom of the slot 106 and in an axial direction, the front end of the sensor 108 being exposed to the water and the rear end of the sensor 108 extending into a cavity 110 formed in the front section 100. A compressible bushing 112 surrounds the intermediate portion of the sensor 108 and forms a watertight connection between the sensor 108 and the portion 100. A circuit board 114 is positioned in the cavity 110 and a wire 116 runs from the sensor 108 to the circuit board 114. Another wire 118 runs from the circuit board 114 to a coil of wire 120 through a cavity 122 in the intermediate portion 102. Another watertight bushing 124 surrounds the wire 118 as it leaves the intermediate portion 102.

The intermediate portion 102 is so shaped that with the portion 100 a streamlined member is provided. Fins 126 extend radially from the intermediate portion 102, along the front portion of the length of the intermediate portion 102, for fixing the intermediate portion 102 inside the front end of the tubular portion 104. A compressible O-ring 127 may be positioned in an annular slot 129 in the front face of the portion 102 so that when the portions 100 and 102 are fixed together, in any known manner, the chamber formed by the cavities 110 and 122 is watertight. A plate 128 is positioned in contact with the rear edges of the fins 126. The plate 128 has a large, round, centrally located hole 130 fitting the portion 102 in the vicinity of the bushing 124. Several large radially extending holes 132 are provided through the plate 128, the holes 132 being blocked by the wire 118 comprising the coil 120. The rear end of the cylinder 104 is closed by a plate 134 having a center cone 136 through which water can flow and through which the wire comprising the coil 120 is paid out centrally. The plate 134 also has radially extending holes 138 therethrough. The holes 132 and 138 may be similar.

As the probe of FIGS. 2 and 3 descends into the water, the water passes through the spaces between the streamlined portion 102 and the tubular portion 104 and out through the portion of the holes 132 and 138 that is not covered by the wire 118 of the coil 120 and through the cone 136. The sensor 108 senses the temperature of the water and the information is transmitted in a manner similar to that described in connection with a sensor 22 of FIGS. 1 and 2. The water, in going through the probe 99 while the coil 120 covers the maximum area of the holes 132 and and 138, provides the maximum resistance to the motion of the probe 99 through the water. As the wire 118 comprising the coil 120 is paid out, the probe 99 becomes lighter, whereby its speed would tend to decrease. However, as the wire 118 comprising the coil 120 is paid out, the coil 120 covers less and less of the area of the holes 132 and 138 through the plates 128 and 134, and the water, in flowing through the probe 99, encounters less resistance, whereby the speed of the probe tends to increase. Therefore, the probe of FIG. 3, like the probe of FIGS. 1 and 2, descends at a uniform rate since the resistance to motion of these probes is decreased as the weight thereof decreases. The probe of FIGS. 3 and 4 operates in an improved manner when the water passageway therethrough is sufficiently large to minimize turbulence of the flow of water through the body of the probe 99.

I claim:

1. A probe which descends at a uniform rate through a fluid due to the force of gravity even though the weight thereof decreases, which comprises:

a chamber containing a coil of wire which is paid out as said probe moves, means including said coil for decreasing the impedance to the motion of said probe through said fluid as the wire comprising said coil is paid out, and in which a spoiler vane is mounted on said probe for motion with respect to the body of said probe between positions in which said spoiler vane extends more or less from the body of said probe and including means to cause said vane to move to a position where its extent is decreased as the wire comprising said coil is paid out.

2. The invention of claim 1 in which said spoiler vane comprises a front plate and a lever fixed thereto, said lever being pivoted on said probe, the rear end of said lever extending into said coil and spring means to urge the rear end of said lever against the inside course of said coil.

3. The invention of claim 2 in which a plurality of spoiler vanes are provided which are opposed to each other in position with respect to the body of said probe.

4. The invention of claim 2 in which said spoiler vane is in the shape of a T and in which the body portion of said probe is slotted to receive said spoiler vane.

5. The invention of claim 1 in which said vane extends from the front surface of said probe.

6. A probe which descends at a uniform rate through a fluid due to the force of gravity even though the weight thereof decreases, which comprises:
    a chamber containing a coil of wire which is paid out as said probe moves,
    means including said coil for decreasing the impedance to the motion of said probe through said fluid as the wire comprising said coil is paid out, and
    in which symmetrically positioned slots of similar shape are provided in the surface of said probe and an ambient condition sensor is positioned in one of said slots so that an end thereof is in the bottom of said one of said slots.

7. A probe which descends at a uniform rate through a fluid due to the force of gravity even though the weight thereof decreases, which comprises:
    a chamber containing a coil of wire which is paid out as said probe moves,
    means including said coil for decreasing the impedance to the motion of said probe through said fluid as the wire comprising said coil is paid out, and
    in which a hole is formed through said probe and said coil of wire is situated to impede the flow of fluids through said probe, whereby as said wire is paid out said impedance becomes less.

8. The invention of claim 7 in which a plate is positioned across the hole through said probe, said plate having holes therethrough and wherein said coil is positioned to impede the flow of fluid through said holes in said plate.

9. The invention of claim 8 in which a slot is formed in a face of said probe and a sensor is positioned in said slot.